United States Patent
Schmitt et al.

(10) Patent No.: US 7,149,026 B2
(45) Date of Patent: Dec. 12, 2006

(54) SENSOR UNIT FOR AUTOMATICALLY SWITCHING OF LIGHTING DEVICES AND COUPLING MEDIUM FOR A SENSOR UNIT

(75) Inventors: Patrick Schmitt, Lichtenau (DE); Bruno Hodapp, Achern-Oensbach (DE); Hans Meier, Ottersweier (DE); Henry Blitzke, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 10/363,597

(22) PCT Filed: Jun. 1, 2002

(86) PCT No.: PCT/DE02/02018

§ 371 (c)(1),
(2), (4) Date: Aug. 1, 2003

(87) PCT Pub. No.: WO03/004309

PCT Pub. Date: Jan. 16, 2003

(65) Prior Publication Data
US 2004/0042223 A1    Mar. 4, 2004

(30) Foreign Application Priority Data
Jul. 4, 2001    (DE) .................. 101 32 454

(51) Int. Cl.
*G02F 1/15*    (2006.01)
(52) U.S. Cl. ............ 359/265; 250/227.25; 250/214 AL
(58) Field of Classification Search ............... 362/61, 362/80, 276, 293, 465; 315/149, 151, 159; 359/71, 416, 419, 365; 356/445; 250/227.25, 250/339.1, 214 AL, 216; 349/16; 454/151, 454/141
See application file for complete search history.

(56) References Cited

U.S. PATENT DOCUMENTS

| | | | | |
|---|---|---|---|---|
| 4,785,170 A | * | 11/1988 | Witt | 356/416 |
| 5,036,437 A | * | 7/1991 | Macks | 362/465 |
| 5,803,358 A | * | 9/1998 | Ruettiger | 250/214 AL |
| 6,038,016 A | * | 3/2000 | Jung et al. | 356/71 |
| 6,049,387 A | * | 4/2000 | Griesinger | 356/419 |
| 6,186,886 B1 | * | 2/2001 | Farrington et al. | 454/141 |
| 6,493,128 B1 | * | 12/2002 | Agrawal et al. | 359/265 |
| 6,573,995 B1 | * | 6/2003 | Beutner et al. | 250/227.25 |
| 6,671,008 B1 | * | 12/2003 | Li et al. | 349/16 |
| 6,818,881 B1 | * | 11/2004 | Chernichovski et al. | 250/216 |

FOREIGN PATENT DOCUMENTS

| | | |
|---|---|---|
| DE | 24 21 063 | 4/1975 |
| DE | 30 14 048 | 2/1981 |
| DE | 198 15 748 | 10/1999 |

(Continued)

OTHER PUBLICATIONS

McGraw-Hill Dictionary of Scientific and Technical Terms, sixth edition, p. 640.*

(Continued)

*Primary Examiner*—Wilson Lee
(74) *Attorney, Agent, or Firm*—Kenyon & Kenyon LLP

(57) ABSTRACT

A sensor unit for automatic switching of lighting devices of motor vehicles is described. The sensor unit includes at least one light-sensitive sensor, a filter element being situated upstream from it, and the filter element filtering out infrared light. A coupling medium for improving the switching points of the sensor unit and the use of a coupling medium and a filter for improving the switching points of the sensor unit are also described.

9 Claims, 3 Drawing Sheets

FOREIGN PATENT DOCUMENTS

| | | |
|---|---|---|
| DE | 198 37 160 | 2/2000 |
| DE | 199 33 642 | 3/2001 |
| EP | 0 869 043 | 10/1998 |
| WO | WO 01 05626 | 1/2001 |

OTHER PUBLICATIONS

McGraw-Hill dictionary of scientific and technical terms, 6th edition, copyright 2003, p. 1076.*

* cited by examiner

US 7,149,026 B2

SENSOR UNIT FOR AUTOMATICALLY SWITCHING OF LIGHTING DEVICES AND COUPLING MEDIUM FOR A SENSOR UNIT

FIELD OF THE INVENTION

The present invention relates to a sensor unit for automatic switching of lighting devices, a coupling medium for coupling such a sensor unit to a pane, as well as the utilization of a coupling medium and a filter.

BACKGROUND INFORMATION

Numerous such sensor units with which the lighting devices of a motor vehicle are controlled as a function of signals from light-sensitive sensors are known, e.g., from published German Patent Application 199 33 642. They have sensors which detect the lighting conditions outside the vehicle, the sensors being connected to an analyzing device in which it is determined from the sensor signals whether the currently existing lighting conditions make a change in the switching state of the lighting devices necessary. The lighting devices are then switched on or off according to this analysis.

SUMMARY OF THE INVENTION

The sensor unit according to an embodiment of the present invention has the advantage over the related art that the switching characteristics, in particular individual on and off switching points of the sensor unit, are substantially improved by the upstream placement of a filter element which filters infrared light out.

In an embodiment of the present invention, the filter element filters out light having wavelengths of more than 750 nm, since these are above the perception threshold of the human eye.

In another embodiment, the filter element has adhesive properties, since, in this way, the filter element may be directly glued to the inside or outside of the windshield of the motor vehicle.

In an additional embodiment, the filter element is provided with lens properties, thus combining the filter property with the lens property.

Furthermore, in another embodiment, several sensors, which detect light from different directions, are provided. In this case, different filtering thresholds of the filter elements may also be provided for the different directions.

In another embodiment, an optical light guide, attachable to a pane via a coupling medium, is placed upstream from the sensor and the pane or the coupling element and filters out the infrared light having wavelengths of more than 750 nm in particular. Regular sensor units may thus be retrofitted with an infrared filter layer.

The coupling medium according to an embodiment of the present invention has an infrared filter for the sensor unit placed upstream from the transmitter such that, for example, the response of an existing sensor unit may be improved by simply replacing the coupling medium.

The coupling medium may be composed of a sheet or a film having an adhesive applied to it, since the coupling medium may thus be able to hold the sensor unit on the pane in a self-adhesive manner.

In an additional embodiment, the coupling medium has an overall curvature, since gas bubbles or air bubbles in the coupling area cause interfering diffusions which may easily be prevented in this way. Of course, the sensor unit may also have a slight curvature on its mounting side, causing the same effect.

In other embodiments, an optically transparent coupling medium or a filter for filtering radiation is used for automatic control of lighting devices.

In yet another embodiment, the sensor unit has a control device for controlling the lighting devices, the control device changing the on and off switching points of the lighting devices by taking into account the IR signals measured separately. Since IR signals are available in many cases from the climate control or from a rain sensor, the switching characteristics of the sensor unit may thus be improved without incurring any additional costs.

In another embodiment of the present invention, values are assigned to the signals of the light sensors and to the IR signals, respectively, and the values of the former signals are acted upon by the values of the IR signals. A factor is considered here, resulting in an electronic filter effect.

In another embodiment, the switching thresholds of the control device are raised or lowered taking the IR signals into account.

DETAILED DESCRIPTION

Figure 1:
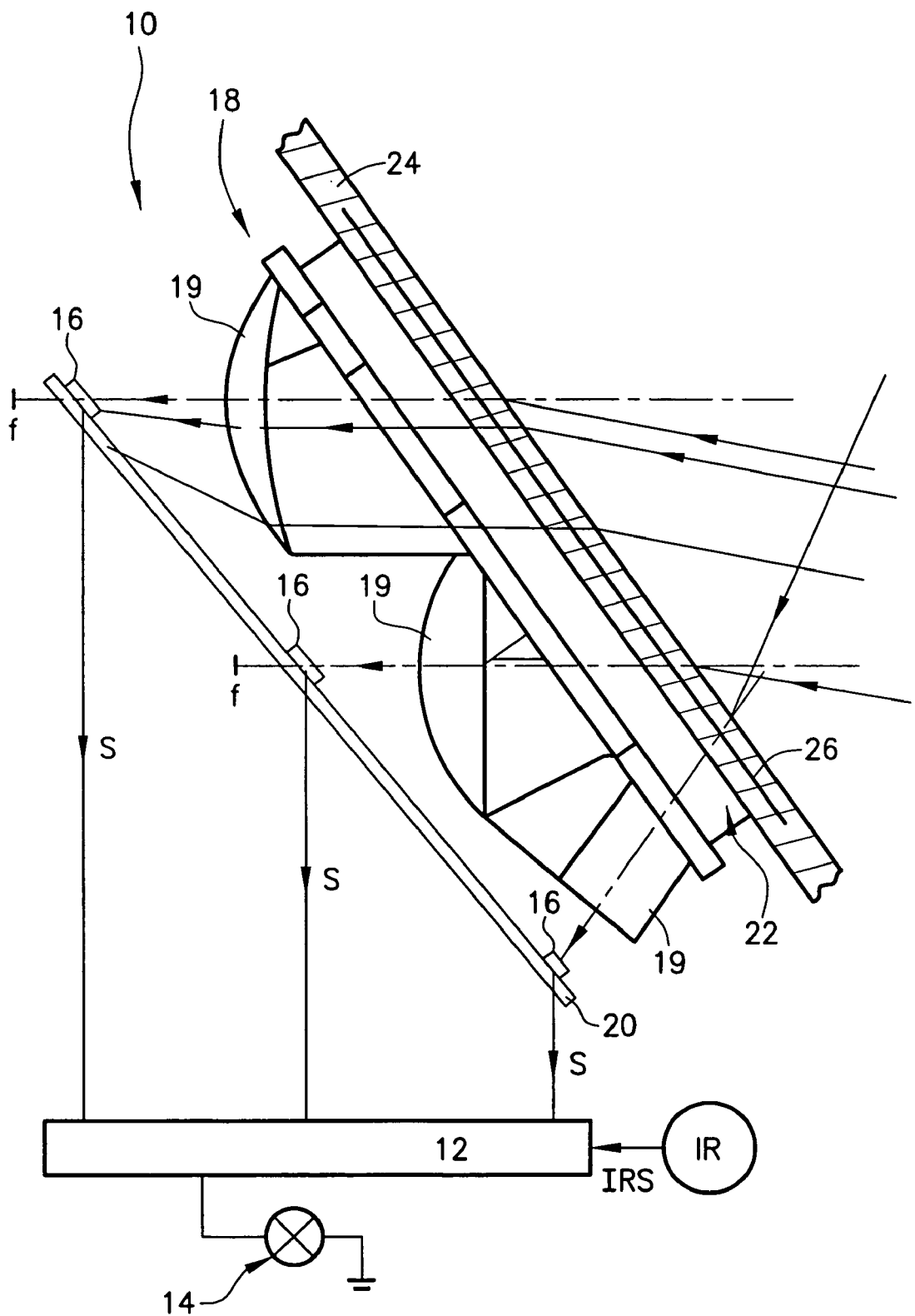
FIG. 1 is a schematic illustration of a sensor unit according to the present invention.

FIG. 1 schematically shows an embodiment of a sensor unit 10 according to the present invention.

Sensor unit 10 is essentially composed of a control device 12, which is able to control lighting devices 14, and sensors 16 which are connected to control device 12, emitting signals (S) to control device 12. Standard receivers BPW 24S of Infineon Corporation may be used as sensors, for example.

Furthermore, an optical light guide 18 having imaging structures 19 which are designed as lenses or holograms is placed upstream from sensors 16. Sensors 16 are positioned approximately on the optical axis of structures 19 and are supported by a mutual circuit board 20 on which control device 12 is also situated. Of course, structure 19 is not necessary for detecting the overall surrounding light; however, a lens having an extremely long focal distance f, up to an infinite focal distance, may be used, for example.

Sensor unit 10 is attached to a pane 24, the windshield of a motor vehicle, for example, via a coupling medium 22. Coupling medium 22 is situated between optical light guide 18 and pane 24. Normally, the housing of sensor unit 10 is sealed by optical light guide 18.

An IR film 26, reflecting the infrared radiation having a wave length of more than 700 nm, is situated in pane 24. In this way, very little or no incident infrared radiation is transmitted in the direction of sensors 16.

Of course, an IR film may also be placed in coupling medium 22 or on its surfaces. It is also possible in particular to design coupling medium 22 of a material which is relatively non-transparent to infrared radiation.

Optical light guide 18 may be made of a material which is non-transparent to infrared light, or at least the areas of optical light guide 18 which focus the incident radiation on sensors 16 may be made non-transparent to infrared light. For example, appropriate filter molecules may be added during injection molding or a multi-component injection molding method may be used.

Applying infrared filters directly on sensors 16 or immediately upstream of the same represents another alternative. In particular, infrared insensitive sensors 16 may also be used.

It is also conceivable to apply an infrared-transparent layer on optical light guide 18.

In another embodiment of the present invention, an infrared-transparent film may be glued onto pane 24 in the area of sensor unit 10, or it may be attached in a different manner, e.g., by adhesion.

Of course, the features of different embodiments explained in the preceding paragraphs may be combined in many different ways.

The IR threshold may be accurately adjusted by the selection of suitable materials, their configurations, and transmission spectra.

Furthermore, sensor unit 10 may be integrated into a rain sensor. Infrared-blocking layers (sun protect layers) are typically recessed in pane 24 in the area of the rain sensor, since numerous rain sensors use infrared light for detecting precipitation. The infrared-blocking layer may again be inserted in the area of sensor unit 10 as a window, or—depending on the geometry of the rain sensor—the rain sensor including the sensor unit may be situated in the edge area of the infrared-blocking layer.

In a further variant embodiment, coupling medium 22 may have an infrared-blocking design in the area of the sensor unit and may be transparent to infrared light in the areas of the rain sensor. Coupling medium 22 may be manufactured by a two-component or multi-component injection molding method.

Figure 2:
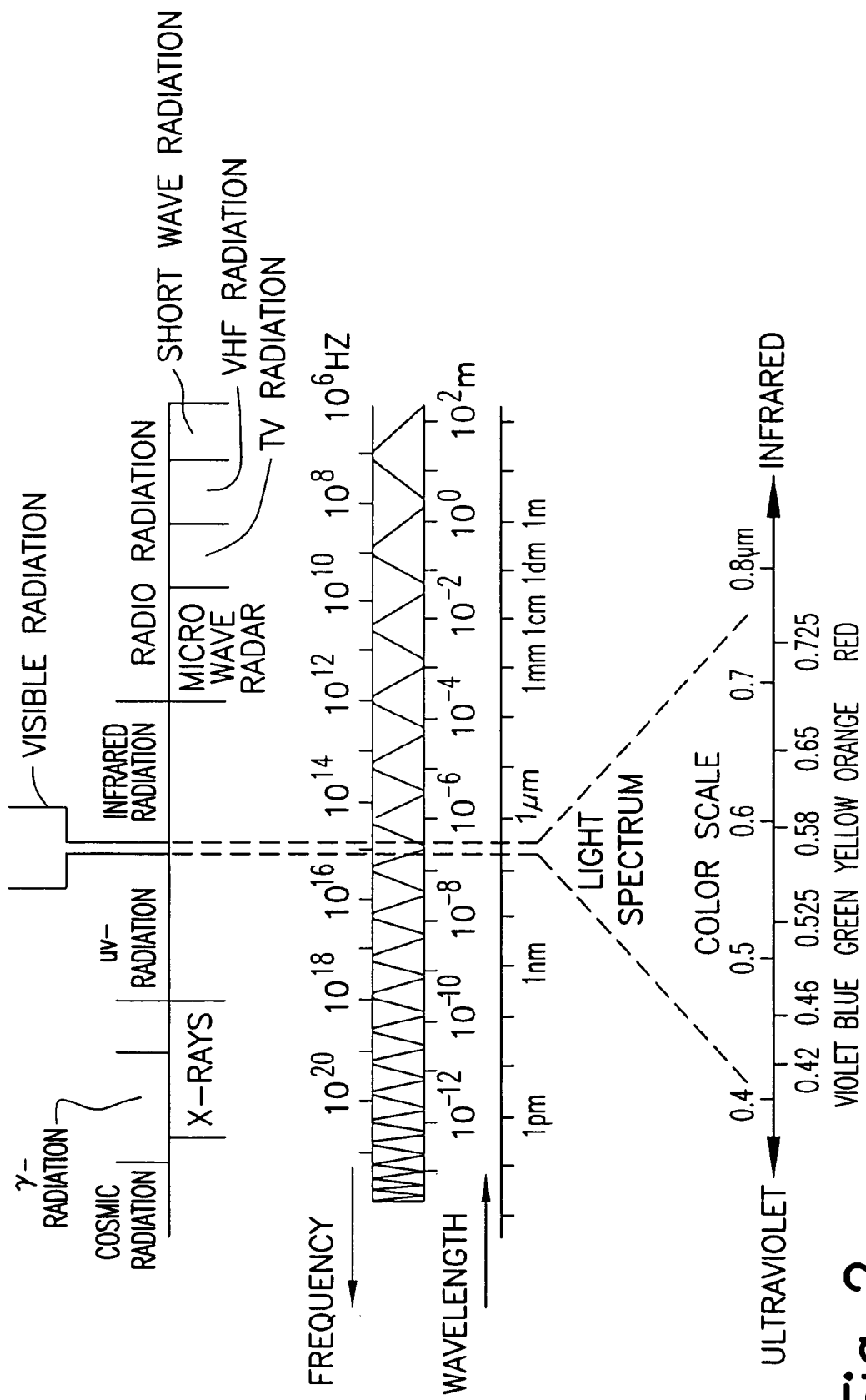
FIG. 2 shows a radiation spectrum of electromagnetic radiation.

FIG. 2 shows a radiation diagram of electromagnetic radiation. The visible radiation, i.e., the light radiation, ranges approximately from 400 nm to 750 nm wavelength. The infrared radiation extends approximately between 750 nm and 0.1 mm wavelength. In addition to visible radiation, sunlight also has numerous other components, such as, for example, a large portion of infrared radiation.

In another embodiment of the present invention, the effects of the infrared radiation may be compensated electronically. IR signals IRS are supplied to control device 12 for this purpose. In the control device, values are assigned to IR signals IRS and to signals S of sensors 16. An offset is calculated by multiplying the values of IR signals IRS by a factor F and adding to the values assigned to signals S.

Figure 3:
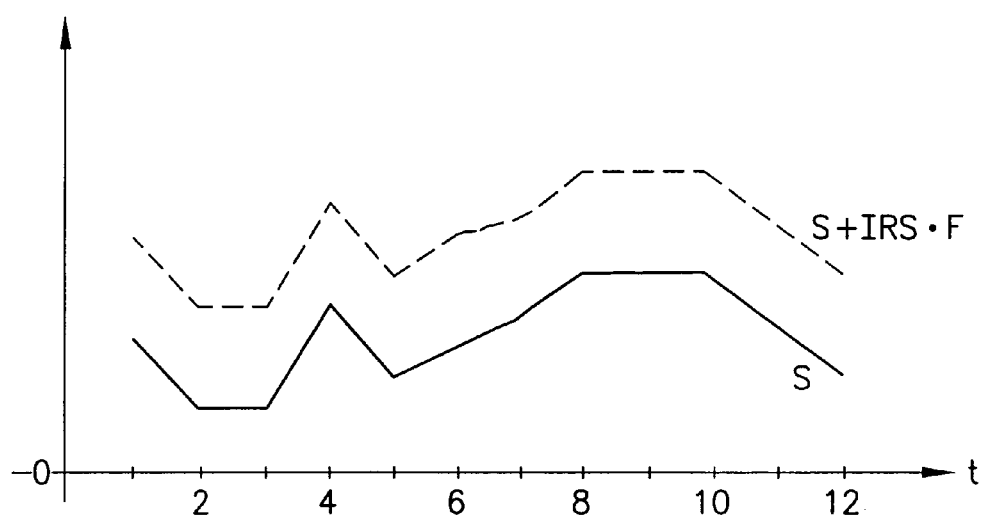
FIG. 3 shows an exemplary signal characteristic of the sensors.

A signal characteristic thus obtained is illustrated in FIG. 3. Signal S and the corrected signal over time are shown as examples here. IR signal IRS is constant in the period shown; it changes over a longer period of time, of course.

Other algorithms for taking the IR signals into account are possible. For example, switching thresholds or other parameters that are characteristic for the on and off switching points of control device 12 may be changed by taking the IR signals into account.

IR signals IRS may be generated by using a specific receiver, e.g., a BPW 34 photodiode having a daylight blocking filter made by the Infineon Corporation. This receiver emits IR signals IRS which are a measure of the incident infrared radiation. However, such a photodiode or a similar photodiode is frequently already integrated into rain sensors so that suitable IR signals IRS are already available.

It is also possible to separately measure the ambient luminosity in different spectral ranges, e.g., infrared, red, green, blue, ultraviolet, and in different spatial directions. The different measured values may then be separately weighted and better adapted to the human perception threshold. This makes it possible to optimally adjust the on and off switching points to the vehicle driver. The weighting factors may be readjusted by the vehicle driver himself, in order to adjust the sensitivity of the sensor unit to his or her individual needs. Such an adjustment may take place, for example, via central electronics, i.e., for example, via a touch screen of a driver interface which, for example, also has a climate control, a navigation system, and other components known in this connection to those skilled in the art.

What is claimed is:

1. A sensor unit for automatically switching a lighting device of a motor vehicle, comprising:
   at least one light-sensitive sensor, the sensor detecting a brightness in light surrounding the sensor unit;
   a control device configured to control the lighting device in accordance with the detected brightness; and
   an arrangement for compensating for an effect from infrared light;
   wherein the arrangement includes a filter element situated upstream from the sensor, the filter element filtering out infrared light; and
   wherein the filter element is substantially transparent to all visible light.

2. The sensor unit as recited in claim 1, wherein the filter element filters out light having wavelengths of more than 750 nanometers.

3. The sensor unit as recited in claim 1, wherein the arrangement has an adhesive property.

4. The sensor unit as recited in claim 1, wherein the arrangement has lens properties.

5. The sensor unit as recited in claim 1, wherein a plurality of light-sensitive sensors are provided.

6. The sensor unit as recited in claim 1, wherein the arrangement includes an optical light guide, situated upstream from the sensor, and a coupling medium, the optical light guide being attachable by the coupling medium to a pane, wherein one of the pane and the coupling medium filters out infrared light having wavelengths of more than 750 nanometers.

7. A sensor unit for automatically switching a lighting device of a motor vehicle, comprising:
   at least one light-sensitive sensor, the sensor detecting a brightness in light surrounding the sensor unit;
   an arrangement for compensating for an effect from infrared light; and
   a control device, wherein the control device controls the lighting device, the control device receiving IR signals from the light-sensitive sensor, the IR signals representing a measure of the infrared light measured by the light-sensitive sensor, and the control device analyzing light signals from the light-sensitive sensor, taking the IR signals into account to control the lighting device.

8. A sensor unit for automatically switching a lighting device of a motor vehicle, comprising:
   at least one light-sensitive sensor, the sensor detecting a brightness in light surrounding the sensor unit;
   an arrangement for compensating for an effect from infrared light; and
   a control device, wherein the control device controls the lighting device, the control device receiving IR signals from the light-sensitive sensor, the IR signals representing a measure of the infrared light measured by the light-sensitive sensor, and the control device analyzing light signals from the light-sensitive sensor, taking the IR signals into account, wherein values are assigned to the light signals and to the IR signals, the values of the IR signals being superimposed upon the values of the light signals, taking a predetermined factor into account.

9. A sensor unit for automatically switching a lighting device of a motor vehicle, comprising:

at least one light-sensitive sensor, the sensor detecting a brightness in light surrounding the sensor unit;

an arrangement for compensating for an effect from infrared light; and a control device, wherein the control device controls the lighting device, the control device receiving IR signals from the light-sensitive sensor, the IR signals representing a measure of the infrared light measured by the light-sensitive sensor, and the control device analyzing light signals from the light-sensitive sensor, taking the IR signals into account, wherein the control device has at least one switching threshold that is changeable by taking the IR signals into account.

* * * * *